T. SOKOLOWSKI.
PIN CLUTCH OR GUARD.
APPLICATION FILED AUG. 8, 1912.

1,056,306.

Patented Mar. 18, 1913.

Witnesses
L. B. James
S. M. McColl

Inventor
T. Sokolowski
By H. B. Willson & Co.
Attorneys

UNITED STATES PATENT OFFICE.

TEOFIL SOKOLOWSKI, OF ST. LOUIS, MISSOURI.

PIN CLUTCH OR GUARD.

1,056,308.

Specification of Letters Patent.   Patented Mar. 18, 1913.

Application filed August 8, 1912. Serial No. 714,054.

*To all whom it may concern:*

Be it known that I, TEOFIL SOKOLOWSKI, a citizen of the United States, residing at St. Louis, State of Missouri, have invented certain new and useful Improvements in Pin Clutches or Guards; and I do declare the following to be a full, clear, and exact description of the invention, such as will enable others skilled in the art to which it appertains to make and use the same.

This invention relates to pin clutches, and is especially designed for use in connection with scarf or hat pin guards.

The object of the invention is to provide a simple and efficient guard for preventing the accidental withdrawal of the pin which so often results in its loss.

With this and other objects in view, the invention consists of certain novel features of construction, and the combination and arrangement of parts as will be more fully described and claimed.

Figure 1:
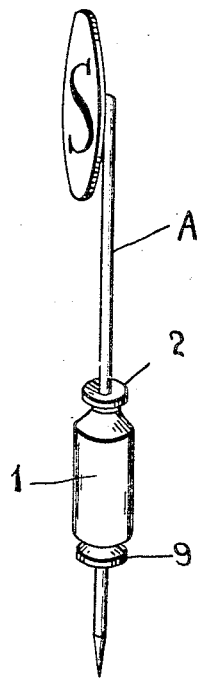
Figure 2:
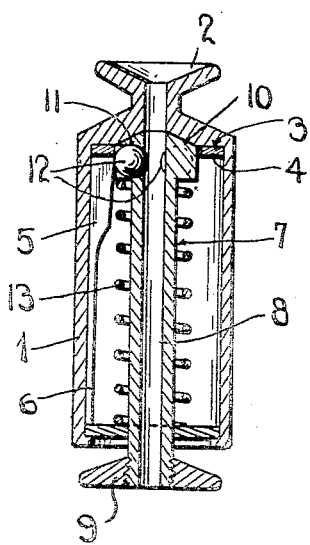
Figure 3:
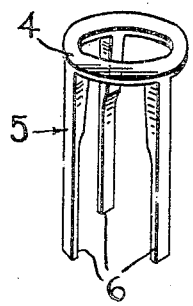

In the accompanying drawings: Figure 1 is a perspective view of a pin equipped with this improved guard; Fig. 2 is a central longitudinal section of the guard on an enlarged scale; Fig. 3 is an enlarged detail perspective view of the cage which guides and coöperates with the pin receiving element.

In the embodiment illustrated, a clutch casing 1 is shown in the form of a tubular cylindrical member which tapers toward one end and terminates in a flared mouth 2 which receives the point of the pin A, the flare of the mouth facilitating the insertion of the pin point. This casing 1 has an annular shoulder 3 on its inner face at the base of its tapered portion, on which is adapted to be seated an annular member 4 of the pin receiving element guide or cage 5. This cage or guide is composed of the annular ring 4 provided with a plurality of spaced fingers 6 extending at right angles from one face thereof in the same direction, and which are of a length sufficient to terminate at a point spaced from the edge of the large end of the casing 1 when the parts are assembled, for a purpose to be described. These fingers 6 are thickened at their bases, and said thickened portions are inclined on their inner faces to coöperate with the tapered end of the casing 1 to form a cone-like socket for the reception of a pin receiving element 7 to be described. When said cage 5 is inserted in the casing 1 the ring member 4 thereof rests on the shoulder 3 of said casing, and the fingers 6 closely engage the inner walls of the casing and form guides for the pin receiving element 7. This pin receiving element 7 comprises a tubular shank 8 having a laterally extending flange 9 at one end and a clutch member 10 at its other end.

The clutch member 10 as shown, is in the form of a hollow head of substantially truncated cone-shape with an aperture in its end communicating with the bore of the tubular shank and with a plurality of radially extending apertures 11 which communicate with said shank and form seats for the clutch balls 12, three of which are here shown. This head has notches in its periphery arranged at the outer ends of the apertures 11 which are designed to engage the fingers 6 of the cage 5 and by means of which said element 7 is guided longitudinally within the casing 1.

A coiled spring 13 encircles the shank 8 and bears at one end against the inner end of the head or clutch member 10 and at its other end against a washer 14 loosely mounted on said shank. The balls 12 are held in their seats by engagement with the inclined cam portion at the base of the fingers 6, and the farther the clutch member 10 is projected into the reduced end of the casing the farther the balls are forced into said clutch member into close relation and thus exert a tighter gripping action on the pin A which is inserted between the balls. When the parts are assembled the edge of the large end of the casing 1 is crimped down over the washer 14, which forms a closure for said casing end, and to release the clutch the shank is moved outwardly against the tension of the spring 13, the flange 9 forming suitable gripping means for actuating said shank. When the flange is released the spring 13 exerts its tension to force the clutch member inwardly into engagement with the inclined faces of the cage fingers and the tapered seat at the reduced end of the casing. It will thus be obvious that the spring 13 normally holds the clutch member 10 projected into the tapered end of the casing 1, and when a pin is inserted between the balls 12 they are spread apart and the clutch member 10 forced back into the casing 1 against the tension of the spring 13, whereby the pin is firmly gripped by said balls and the guard thus securely held engaged therewith.

It will, of course, be understood that the guard may be decorated in any suitable or desired manner.

To release the pin, the flange 9 as above described, is moved outwardly, which withdraws the clutch member 10 from engagement with the walls of the tapered end of the casing 1 and with the fingers 6 and permits the balls to move away from each other and disengage the pin.

When the parts are assembled the washer 14 rests on the free outer ends of the fingers 6 which terminate at a point spaced a slight distance from the edge of the large end of the casing.

From the foregoing description taken in connection with the accompanying drawings, the construction and operation of the invention will be readily understood without requiring a more extended explanation.

Various changes in the form, proportion and the minor details of construction within the scope of the appended claims may be resorted to without departing from the principle or sacrificing any of the advantages of the invention as claimed.

I claim as my invention:

A pin guard comprising a tubular clutch casing open at both ends and having one end tapered, a cage removably mounted in said casing and comprising an annular member adapted to fit closely within the casing and having spaced fingers extending at right angles from one face thereof and provided at their inner ends on their inner faces with cams, a pin receiving element slidably mounted in said casing and comprising a tubular shank having a laterally extending flange at one end and a clutch head at the other end provided with ball seats extending transversely through said head and communicating with the bore of said shank, said head being notched at the outer ends of said ball seats to engage the guide fingers of said cage which form closures for said seats when so engaged, clutch balls mounted in said seats and held in operative position by said guide fingers when the parts are assembled, said balls being smaller than said seats to permit them to project into the bore of the shank, and a spring mounted on said shank for holding said clutch head normally in operative position.

In testimony whereof I have hereunto set my hand in presence of two subscribing witnesses.

TEOFIL SOKOLOWSKI.

Witnesses:
LOUIS PETERS,
JAMES FOX.